US 6,280,867 B1

(12) United States Patent
Elias

(10) Patent No.: US 6,280,867 B1
(45) Date of Patent: Aug. 28, 2001

(54) APPARATUS FOR PUMPING A FLUID IN A FUEL CELL SYSTEM

(75) Inventor: Elias R. Elias, Milton, MA (US)

(73) Assignees: Griff Consulting, Inc., Milton, MA (US); Thomas Pfeiffer, Eggstaett (DE)

( * ) Notice: Subject to any disclaimer, the term of this patent is extended or adjusted under 35 U.S.C. 154(b) by 0 days.

(21) Appl. No.: 08/985,555

(22) Filed: Dec. 5, 1997

(51) Int. Cl.[7] .................. H01M 2/00; H01M 8/00
(52) U.S. Cl. .................. 429/34; 429/13; 429/20; 222/333
(58) Field of Search ................ 429/34, 13, 20; 222/333

(56) References Cited

U.S. PATENT DOCUMENTS

| Re. 31,586 | 5/1984 | Magnussen, Jr. ............... 417/22 |
| Re. 31,608 | 6/1984 | Magnussen, Jr. ............... 417/22 |
| 3,179,500 | 4/1965 | Bowen et al. . |
| 3,704,965 | * 12/1972 | Mentschel et al. . |
| 3,917,531 | 11/1975 | Magnussen ............... 210/101 |
| 3,991,574 | * 11/1976 | Frazier . |
| 4,131,393 | 12/1978 | Magnussen, Jr. ............... 417/22 |
| 4,180,375 | 12/1979 | Magnussen, Jr. ............... 417/22 |
| 4,389,163 | 6/1983 | Magnussen, Jr. et al. ............... 417/2 |
| 4,670,357 | 6/1987 | Taylor ............... 429/12 |
| 4,706,737 | 11/1987 | Taylor et al. ............... 165/47 |
| 4,738,903 | 4/1988 | Garrow et al. ............... 429/17 |
| 4,743,517 | 5/1988 | Cohen et al. ............... 429/17 |
| 4,751,151 | 6/1988 | Healy et al. ............... 429/17 |
| 4,755,439 | 7/1988 | Trocciola et al. ............... 429/22 |
| 4,769,297 | 9/1988 | Reiser et al. ............... 429/17 |
| 4,782,669 | 11/1988 | Trocciola et al. ............... 62/434 |
| 4,786,568 | 11/1988 | Elmore et al. ............... 429/44 |
| 4,800,138 | 1/1989 | Romanowski et al. ............... 429/19 |
| 4,801,356 | 1/1989 | Grasso ............... 203/11 |
| 4,804,591 | 2/1989 | Grasso et al. ............... 429/12 |
| 4,816,040 | 3/1989 | Bonville et al. ............... 55/42 |
| 4,816,353 | 3/1989 | Wertheim et al. ............... 429/19 |
| 4,820,129 | 4/1989 | Magnussen, Jr. ............... 417/18 |
| 4,824,738 | 4/1989 | Misage et al. ............... 429/12 |
| 4,824,740 | 4/1989 | Abrams et al. ............... 429/24 |
| 4,824,741 | 4/1989 | Kunz ............... 429/26 |

(List continued on next page.)

FOREIGN PATENT DOCUMENTS

| 0 198 979 | 10/1996 | (EP) . |
| 1 532 246 | 11/1968 | (FR) . |
| 1114489 | 12/1965 | (GB) . |
| 1447835 | 9/1976 | (GB) . |

OTHER PUBLICATIONS

Rainin Instrument Co., Inc., "Dynamax, Analytical and Preparative HPLC Solvent Delivery Systems, Models SD–200 and SD–300", Copyright 1994–1995.

Daimler–Benz AG, Kommunikation (KOM), "NECAR II – Driving without Emissions" May, 1996.

Primary Examiner—Stephen Kalafut
Assistant Examiner—Tracy Dove
(74) Attorney, Agent, or Firm—Choate, Hall & Stewart

(57) ABSTRACT

Described is a system to deliver fluid to a fuel cell. The system includes a source of fluid, a fuel cell and a fluid delivery device in fluid communication therewith. The delivery device includes a pump having a reciprocating piston for drawing fluid from the source, pressurizing the fluid and delivering the fluid to the fuel cell accurately and reproducibly. In a further aspect of the disclosure, there is included a reformer system in fluid communication with an outlet of the pump. The reformer system includes a vaporizer which converts the fluid into a gas thereby generating a back pressure with respect to the pump. The back pressure varies with fluid flow rate and the back pressure also has a random component. The pump accurately and reproducibly delivers the fluid to the vaporizer against such back pressure.

9 Claims, 6 Drawing Sheets

U.S. PATENT DOCUMENTS

| | | | |
|---|---|---|---|
| 4,828,940 | 5/1989 | Cohen et al. | 429/20 |
| 4,835,072 | 5/1989 | Grasso et al. | 429/12 |
| 4,839,247 | 6/1989 | Levy et al. | 429/21 |
| 4,845,840 | 7/1989 | Elmore et al. | 26/623.2 |
| 4,923,767 | 5/1990 | Grasso et al. | 429/12 |
| 4,973,529 | 11/1990 | Grasso et al. | 429/12 |
| 5,023,151 | 6/1991 | Landau et al. | 429/24 |
| 5,034,287 | 7/1991 | Kunz | 429/13 |
| 5,064,732 | 11/1991 | Meyer | 429/13 |
| 5,132,174 | 7/1992 | Romanowski et al. | 429/26 |
| 5,139,894 * | 8/1992 | Mizuno et al. | 429/9 |
| 5,200,278 | 4/1993 | Watkins et al. | 429/24 |
| 5,202,195 | 4/1993 | Stedman et al. | 429/17 |
| 5,262,249 | 11/1993 | Beal et al. | 429/26 |
| 5,294,580 | 3/1994 | Dufner | 502/101 |
| 5,360,679 | 11/1994 | Buswell et al. | 429/19 |
| 5,366,818 | 11/1994 | Wilkinson et al. | 429/13 |
| 5,366,821 | 11/1994 | Merritt et al. | 429/21 |
| 5,409,784 | 4/1995 | Bromberg et al. | 429/13 |
| 5,441,821 | 8/1995 | Merritt et al. | 429/17 |
| 5,469,828 | 11/1995 | Heimberg et al. | 123/497 |
| 5,470,671 | 11/1995 | Fletcher et al. | 429/26 |
| 5,503,944 | 4/1996 | Meyer et al. | 429/13 |
| 5,520,154 | 5/1996 | Heimberg et al. | 123/499 |
| 5,540,206 | 7/1996 | Heimberg | 123/497 |
| 5,573,866 | 11/1996 | Van Dine et al. | 429/13 |
| 5,631,532 | 5/1997 | Azuma et al. . | |
| 5,736,269 * | 4/1998 | Okamoto et al. | 429/32 |
| 5,766,786 | 6/1998 | Fleck et al. . | |

* cited by examiner

APPARATUS FOR PUMPING A FLUID IN A FUEL CELL SYSTEM

BACKGROUND OF THE INVENTION

This invention relates to positive displacement pumps for delivering a fluid in an accurate and reproducible manner. More particularly, the invention relates to a positive displacement pump that delivers fuel and/or water to a fuel cell which utilizes direct oxidation of a hydrogen-containing fuel for the production of electricity.

Over 150 years ago a British physicist conceived of the first fuel cell consisting of an electrochemical reaction of hydrogen and oxygen to produce electricity and water. The electrochemical reaction in the reverse direction is the subject of many secondary education science experiments. In these experiments, the student passes an electrical current through a beaker of water to split water molecules thereby producing hydrogen gas and oxygen gas in a two to one molar ratio. A fuel cell reverses this secondary education learning experience. Simply put, combining hydrogen (a fuel) with oxygen (an oxidant) under the proper conditions, yields water and an electrical charge.

The basic chemical equation reveals the most attractive feature of electrical power production using fuel cell technology. The only byproducts of fuel cells that use hydrogen as the fuel and oxygen as the oxidant are water and electricity. The environmental advantages of using such a fuel cell to generate electrical power are readily apparent. Furthermore, relative to internal combustion engines, fuel cells produce very little waste heat and do not need to "idle" thereby operating more efficiently than internal combustion engines.

Of course, implementation of fuel cell technology in an economical and practical manner has proved difficult. The air around us contains an abundant supply of oxygen for use as the oxidant. Providing suitable hydrogen fuel, however, is recognized as a primary hurdle facing commercial realization of fuel cell technology, especially in vehicles. Storing pure hydrogen gas or liquid on board a vehicle or at vehicle filling stations is unfeasible at this time.

A promising solution to the hydrogen storage problem is the use of an organic compound such as methanol ($CH_4O$; $CH_3OH$) as the fuel. The methanol fuel is then chemically treated or "reformed" to increase the percentage of hydrogen within the fuel before introducing it into the fuel cell. Many organic compounds are suitable as fuels, including many hydrocarbons and other compounds. Although using such fuels increases the environmentally harmful emissions from the fuel cell, these emissions remain an order of magnitude or two below that of internal combustion engines and still at least half that of battery-powered vehicles (when emissions from generation of power to charge the battery are included).

One difficulty with using organic compound fuels is delivering or pumping the fuel through the reforming process and then to the fuel cell. When starting with a liquid fuel such as methanol, the reforming process includes vaporizing the fuel and then introducing the fuel to a catalyst to strip out carbon and oxygen molecules. The reforming process requires that the fuel be pumped into a vaporizer at a high pressure that is directly related to the flow rate of fuel through the reformer. Additionally, the reforming process produces random pressure fluctuations on top of the flow rate-related pressure. Furthermore, in order to optimize efficiency of the fuel cell, it is very important to deliver precise quantities and flow rates of the fuel to the fuel cell. Otherwise, the fuel will be wasted because there will be either too much or too little oxidant in the fuel cell with which to react. Finally, a fluid delivery system should have a short response time for changes in fuel flow rate in order to adequately respond to the power demands of a typical vehicle.

Water circulation is another difficulty with fuel cells that use organic-compound fuels. In addition to being a byproduct of the electrochemical reaction at the fuel cell, water may be used as an additive to or humidifier of the fuel (see, e.g., U.S. Pat. No. 5,573,866 to Van Dine et al.), as a coolant in the fuel cell (see, e.g., U.S. Pat. No. 5,503,944 to Meyer et al.) and as an humidifier of the oxidant-air supply (see, e.g., U.S. Pat. No. 5,366,818 to Wilkinson et al.). Thus, it is important to provide a fluid delivery system that is compatible with both organic solvents and water.

Traditional systems of delivering fuel, such as a fuel injector used with an internal combustion engine, have proved inadequate for use in a fuel cell with a reformer process In general, these types of systems do not respond well or quickly to a varying and random back pressure such as that produced by a reformer in a fuel cell system. In particular, and among other difficulties, there are three basic shortcomings present in fuel injectors and related systems.

First, a fuel injection system depends upon maintaining precise pressures and pressure differentials within the system. Thus, a relatively complicated and expensive pressure regulating mechanism (often including a booster pump and return fuel line) is required within the fuel injection system. Second, the fuel injector system cannot provide reproducible and accurate fuel delivery rates against a variable and/or random back pressure. The fuel injector system delivers fuel by opening a fuel injector valve. A typical fuel injector valve operates electro-mechanically and opens upon a signal from a fuel injector controller. Other fuel injector valves respond to changes in fuel line pressure and upon a sharp increase line pressure, the valve opens and delivers fuel to the engine. In either case, however, the pressure regulator is too slow to respond satisfactorily, and in the face of variable and random back pressure (such as that from a vaporizer or reformer), a constant pressure differential across the valve is difficult to maintain. Without a constant pressure differential, the flow rate from the valve will be uneven. Thus, fuel injection systems cannot provide reproducible and accurate fuel delivery rates against a variable and random back pressure. The third difficulty is that fuel injection systems are incompatible with water and will corrode when exposed to water based solutions.

In view of the foregoing, an object of the invention is to provide an improved apparatus for delivering fluid to a fuel cell and a reforming process.

Another object of the invention is to provide such apparatus to deliver fluid to the fuel cell against a back pressure that is flow-rate dependent.

Yet another object of the invention is to provide such apparatus to deliver fluid to the fuel cell against a back pressure that is randomly variable.

Yet still another object of the invention is to provide such apparatus to deliver fluid to the fuel cell at an accurate and reproducible flow rate against a variable and fluctuating back pressure.

An additional object of the invention is to provide such apparatus to deliver fluid to the fuel cell with a short response time for flow rate changes.

It is another object of the invention to provide such apparatus for delivering both an organic based fluid and a water based fluid to the fuel cell.

Yet still a further object of the invention is to provide such apparatus as can be implemented inexpensively.

SUMMARY OF THE INVENTION

The foregoing objects are among those attained by the invention, which provides in one aspect a system to deliver fluid to a fuel cell. The system includes a source of fluid, a fuel cell and a fluid delivery device in fluid communication therewith. The delivery device includes a pump having a reciprocating piston for drawing fluid from the source, pressurizing the fluid and delivering the fluid to the fuel cell.

In a further aspect of the invention, the system includes a reformer system in fluid communication with an outlet of the pump. The reformer system includes a vaporizer which converts the fluid into a gas thereby generating a back pressure with respect to the pump. The back pressure varies with fluid flow rate and the back pressure also has a random component. The pump accurately and reproducibly delivers the fluid to the vaporizer against such back pressure.

In another aspect of the invention the fluid delivery system includes a controllable piston driver coupled to the piston for discharging fluid from the pump chamber. The fluid delivery system also includes a controller coupled to the piston driver. The controller causes the driver to discharge the fluid from the chamber at a controllable flow rate. The flow rate may depend on a signal which is based upon the amount of electricity desired from the fuel cell.

In yet another aspect of the invention, the pump delivers a water based solvent and another pump delivers a fuel such as methanol. The same type of pump may be used to deliver either fluid to the fuel cell. Additional pumps may be added to the system in parallel to prevent pulsation in the fluid flow.

DETAILED DESCRIPTION OF THE PREFERRED EMBODIMENTS

Figure 1:
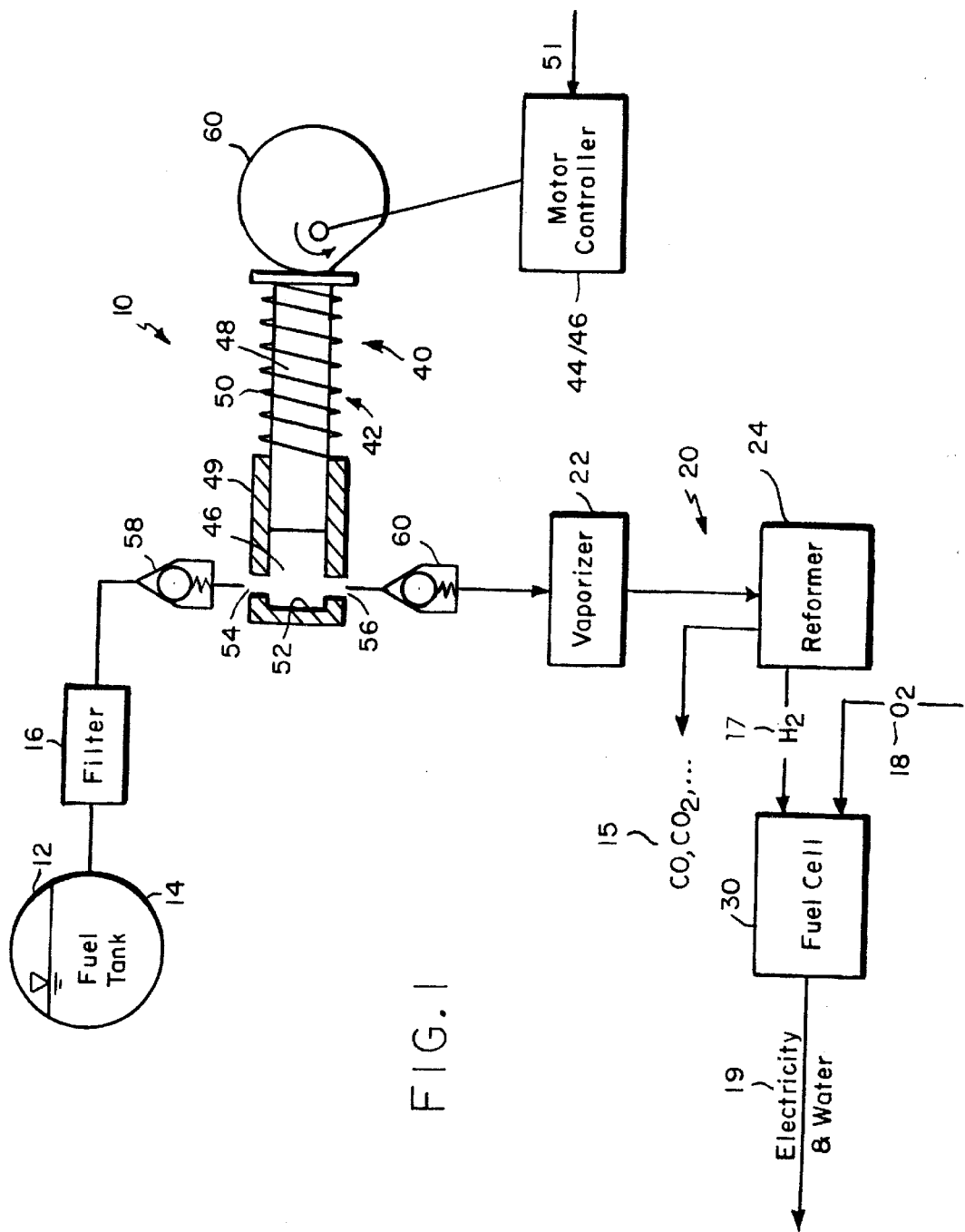
FIG. 1 is a block diagram of a fluid delivery system for a fuel cell and reformer system in accordance with the present invention.

FIG. 1 shows a block diagram of a fuel cell electrical power system indicated generally by reference numeral 10. The fuel cell system 10 includes a fluid source 12, a reformer system 20, a fuel cell 30 and a fluid delivery system 40. The fuel cell system 10 is particularly well-suited for use in a vehicle (not shown) because rather than providing a cumbersome and expensive pure hydrogen fuel storage system, the reformer system 20 converts another fuel, such as methanol or natural gas, into a hydrogen-rich fuel on board the vehicle itself Fuels such as methanol are readily stored in tanks similar to currently mass-produced gasoline tanks. Similarly, filling stations could easily be converted to methanol dispensing stations. Thus, the fuel cell system 10 can produce the hydrogen necessary for the electrochemical reaction while the vehicle is being operated. It will be readily recognized, however, that the invention disclosed herein is not limited to use with a vehicle, but may also be used with any electricity-generating fuel cell system.

The fluid source 12 provides a fuel 14 to the fluid delivery system 40. The fluid delivery system 40 includes a positive displacement pump 42. The pump 42 draws fuel from the source 12, pressurizes the fuel and discharges it into the reformer system 20. The reformer system 20 includes a vaporizer 22 and a reformer 24. The reformer system 20 serves to produce a hydrogen rich gas from the fuel 14. The hydrogen rich gas 17 is introduced into the fuel cell 30 which combines the hydrogen with an oxidant (preferably oxygen from the air) 18 to generate electricity 19, water and a relatively small amount of heat. A portion of the electricity 19 produced by the fuel cell may be used to power the fluid delivery system 40, the reformer system 20 and other components within the fuel cell system. The remainder of the electricity 19 can be used to drive a high-efficiency motor, such as an inductance motor utilizing electromagnets, to power, for example, a vehicle.

The fluid source 12 contains fuel 14 which is a fuel suitable for use in a fuel cell electrochemical reaction, such as methanol, natural gas (or methane) or other hydrocarbon*based liquid. The fluid source 12 may instead contain a water based solution in order to cool the fuel cell system or to humidify the fuel 14 or the oxidant 18. The fluid source 12 includes a tank: or any other storage device capable of holding a water or an organic-compound solution. The fluid source is vented to the atmosphere such that the fuel 14 in the tank is substantially atmospheric. A filter 16 prevents contaminating particles from harming the remainder of the system 10.

The fuel cell 30 may be any fuel cell that oxidizes a hydrogen rich solution and produces electrical energy. Countless fuel cells are known in the art, e.g. U.S. Pat. No. 5,262,249 to Beal et al., and many are suitable for use with this system 10. Similarly, the reformer system 20 for producing hydrogen rich gas is well known in the art. The byproducts of the reforming process generally include carbon monoxide and carbon dioxide 15.

In order to provide sufficient electrical energy to power a vehicle, the fuel 14 must be provided to the reformer system 20 and then to the fuel cell 30 at a certain flow rate and pressure. To produce sufficient quantities of electricity, the fluid delivery system 40 should provide fuel at flow rates varying from about 0.50 to 850 milliliters (ml) per minute, and more preferably providing a maximum flow rate of about 750 ml/min. Furthermore, for practical application in a vehicle, the fluid delivery system 40 should have a dynamic reaction time of about 100 milliseconds (ms) when transitioning from 10% to 90% of the maximum flow rate.

The vaporizer 22 and reformer 24 are such that they produce a back pressure relative to the fluid delivery device 40. It has been found that a reformer system 20 suitable for generating sufficient hydrogen-rich gas to adequately supply the fuel cell 30 produces as much as 300 psi of back pressure and more generally up to 150 psi of back pressure. The back pressure generated by the reformer system is generally related to the flow rate of the fuel through the vaporizer 22.

In addition to back pressure caused by the flow rate of fuel passing through the reformer system 20, operational variables within the reformer system cause random back pressure fluctuations as well. These random fluctuations have been found to be between 1 and 10 psi and more generally between 3 and 6 psi.

The fluid delivery device 40 includes the pump 42, a motor 44 and a controller 46. The pump 42 is a positive displacement pump, preferably including a piston 48. The piston 48 engages a chamber 46 formed by housing 49. A spring 50 biases the piston 48 away from a bottom 52 of the chamber. When the piston 48 moves away from the chamber bottom 52, fuel from the source is drawn into the chamber through inlet 54. When the piston 48 is driven towards the chamber bottom 52, the piston forces the fuel through outlet 56. Check valves 58, 60 prevent back flow and are located at the inlet 54 and the outlet 56 of the chamber 46.

To provide the required flow rates and pressure, without unduly wearing pump seals, it has been found that a desirable piston diameter for use with a passenger vehicle is between about 1.0 to 1.5 inches. Other sizes for other applications are readily used. Similarly, a piston stroke length is about 0.25 to 0.50 inches. A typical stroke volume for the pump, which is determined by multiplying the piston area by the stroke length, is approximately 0.20 to 0.90 cubic inches. The maximum speed at which the pump operates is generally about 100 to 130 strokes/min.

The motor 44 imparts rotational forces on a cam 60 and cam shaft which drives the piston into the chamber 46. The motor is a standard DC motor or stepper motor and operates on 12 volt power, and, of course, other power supplies having 24 or 48 volts DC may also be used. The cam 60 may be designed so that at a constant rotational speed, fluid is drawn into the chamber quickly and subsequently pressurized and discharged at a desired rate. Of course, those skilled in the art will recognize that means other than a cam may be used to drive the piston 48. For example, a linear drive or hydraulic drive could be coupled to the piston. Furthermore, depending on the driver means, the spring 50 may be eliminated from the pump 42.

The controller 46 controls the motor 44 to provide accurate and reproducible pump action. The controller 46 operates based upon predetermined commands or may receive an input signal or signals 51 other devices. In a vehicle, for example, the controller 46 is coupled to a gas pedal to control the desired power level of the vehicle. As in a typical automobile, pressing on the gas pedal provides a signal 51 to the controller to pump more fuel to the fuel cell 30, which in turn generates more electricity to power the vehicle.

As will be recognized by those skilled in the art, the flow rate and pressure of the fluid delivered by pump 42 will have at least some pulsation due to the fluid intake portion of the delivery cycle. Although cam 60, motor 44 and controller 46 design and operation can minimize the pulsation, some pulsation will remain. Two pumps (or more) operating in parallel and out of phase would eliminate such pulsation. See U.S. Pat. No. 3,917,531 to Magnussen, incorporated herein by reference, for an example of such out of phase pump operation.

Figure 2:
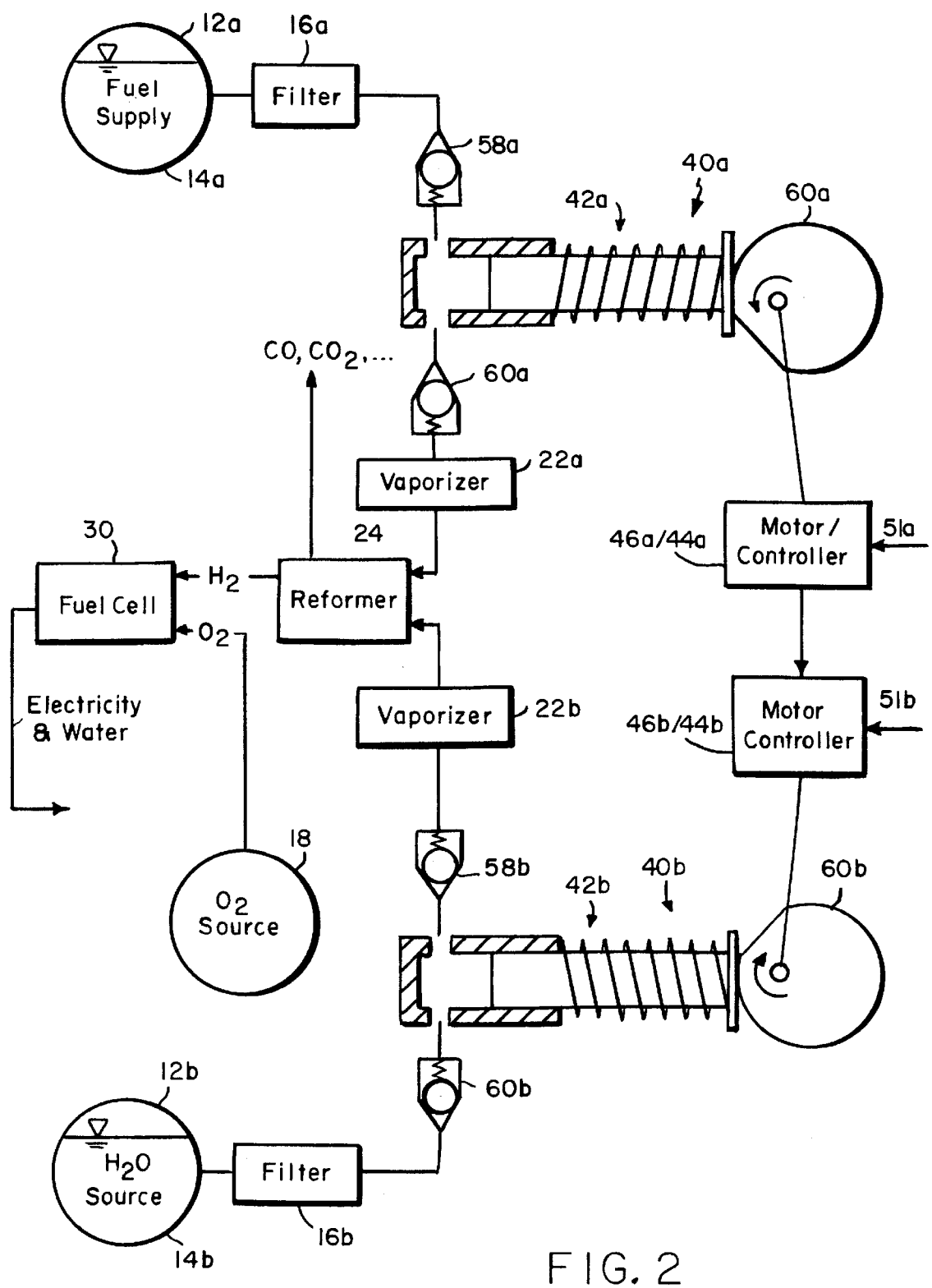
FIG. 2. is a block diagram of another embodiment of the fluid delivery system of the present invention.

Turning now to FIG. 2, two fluid delivery devices 40a, 40b are shown. One delivery device 40a delivers fuel 14a to the fuel cell 30 and the other delivery device 40b provides a water-based solution 14b to the system. The reference numerals used in FIG. 1 correspond to those used in FIG. 2 and the remainder of the figures, with an "a" suffix on the numeral indicating that it is part of a fuel channel and a "b" suffix on the numeral indicating that it is pan of a water channel. The fluid delivery device 40b operates in substantially the same manner as the fluid delivery device 40 described with respect to FIG. 1. The water based solution 14b pumped by device 40b may serve a variety of functions in the fuel cell system. As shown in FIG. 2, the water solution 14b is vaporized by vaporizer 22b and then directed to the reformer 24. The vaporized water-based fluid serves to humidify the fuel in the reformer 24. Other application for the water-based channel include using it to cool the fuel cell (not shown). A return line (not shown) from the fuel cell may be used to recycle the water back to the water source 12b.

The controllers 46a, 46b are coupled together to coordinate the water flow rate and the fuel flow rate in the fuel cell system 10. In many instances it is essential to deliver and maintain a predetermined ratio of water and fuel in the fuel cell system because otherwise the relatively sensitive fuel cell 30 may be damaged. Controllers 46a, 46b are preferably powered by the same power source as the motors 44a, 44b. Of course, the controllers 46a, 46b need not be two separate components. Similarly, the motors 44a, 44b and the cams 60a, 60b may also be arranged as one component.

Figure 3A:
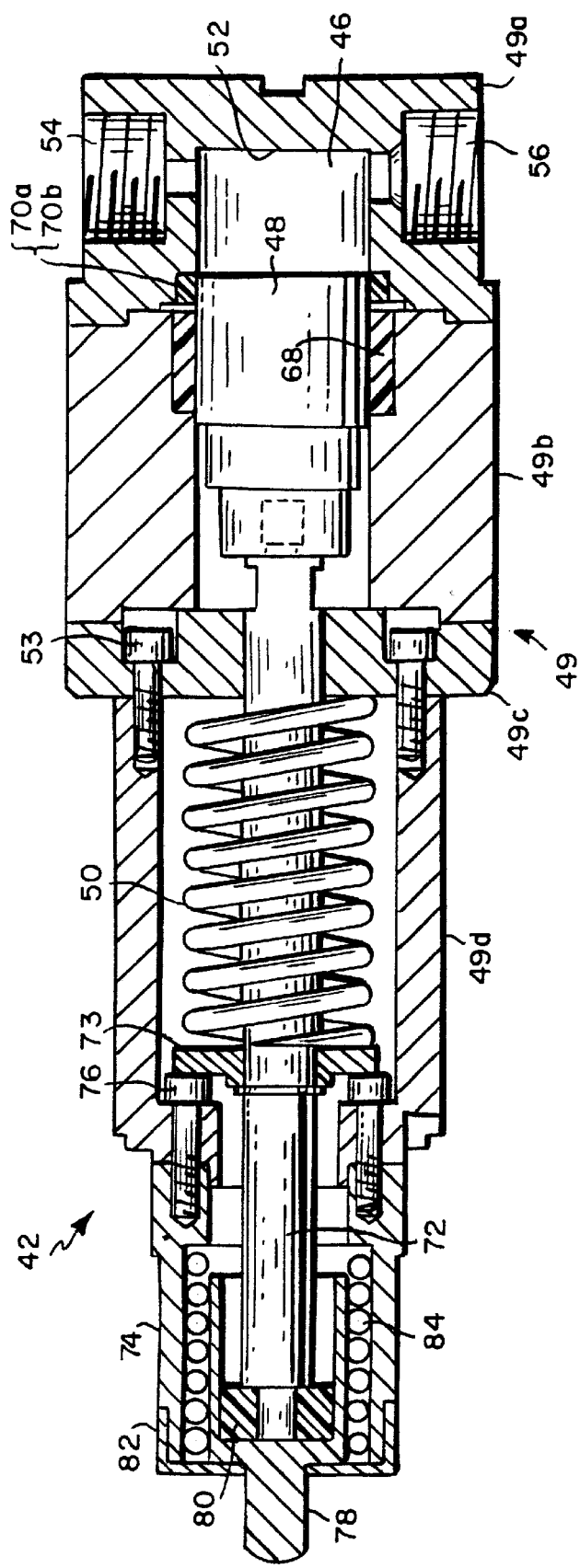
FIGS. 3A and 3B are detailed cross-sectional views of the side and top of a pump for use in the fluid delivery system.
Figure 3B:
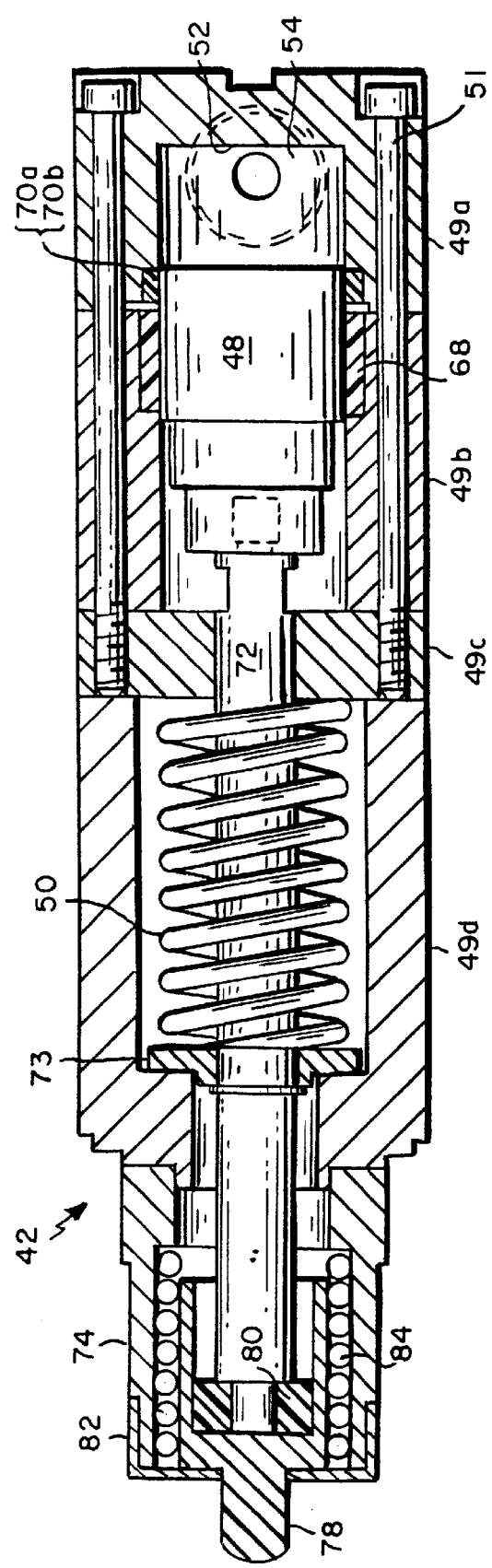
Figure 4:
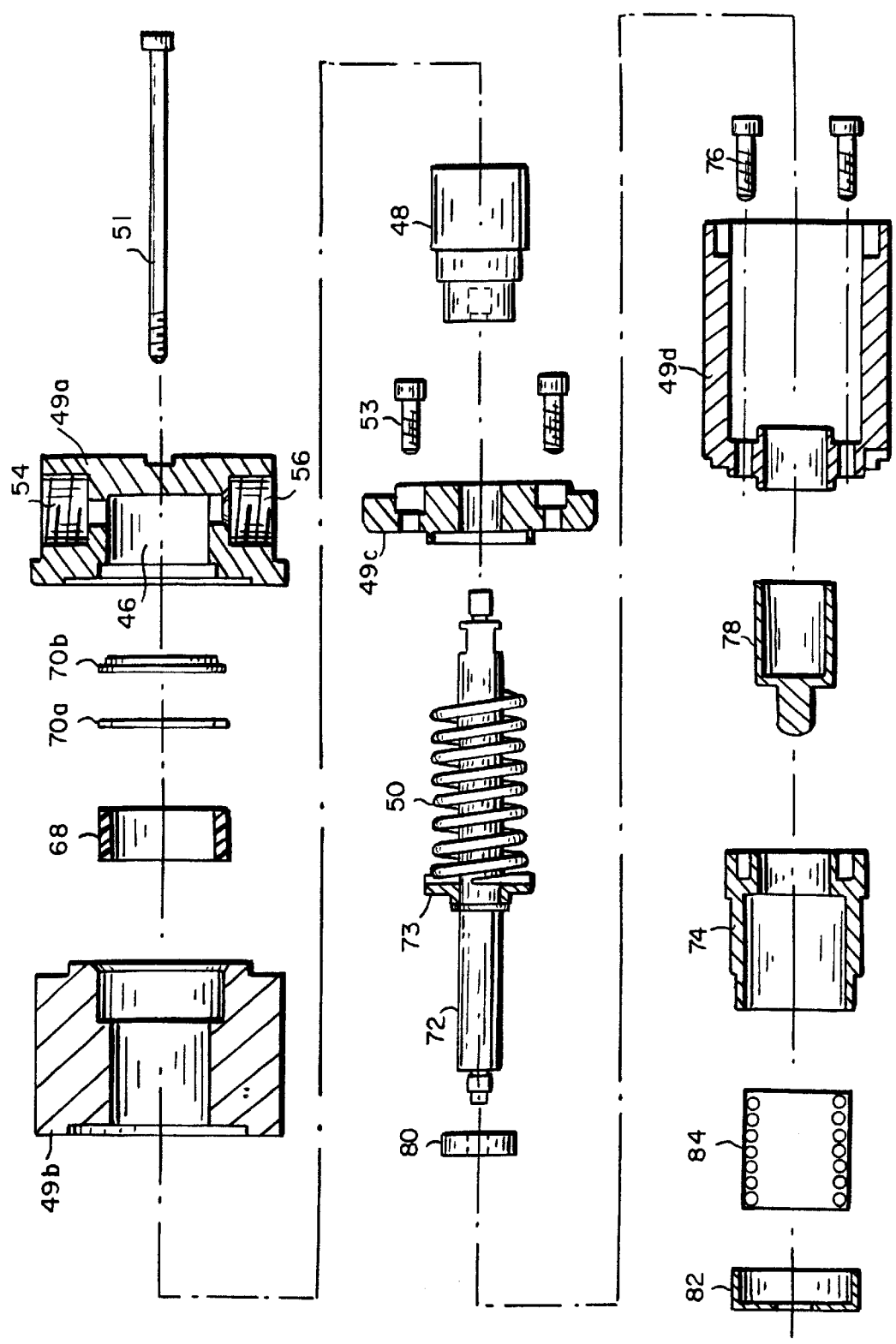
FIG. 4 is an exploded view of the pump of FIGS. 3A and 3B.

FIGS. 3A and 3B depict a detailed cross-sectional side view and top view of the pump 42, and FIG. 4 shows an exploded view of the pump 42. The housing 49 includes liquid head 49a, piston back-up 49b, back-up disk 49c, and spring housing 49d secured together with fasteners 51, 53. Liquid head 49a contains the chamber 46 with the chamber bottom 52. The inlet 54 and the outlet 56 from the chamber are located opposite each other across the chamber.

The piston 48 engages the chamber 46, and back-up ring 70a and seal 70b (see also FIG. 4) prevent fluid leakage from chamber 46. Seal 70b is made of a standard sealant material, preferably an ultra-high molecular weight polyethylene. The seal 70b should also be hydrophobic and organic-solvent resistant in order to withstand both a water and fuel environment. The back-up ring 70a prevents seal 70b from cold flowing as a result of piston movement and friction. A sleeve 68 provides support to the piston 48.

A piston shaft 72 having a shoulder 73 extends from the piston 48 through the housing 49 and through an bearing housing 74. The bearing housing 74 mounts to spring housing 49d with fasteners 76. The shoulder 73 of the piston shaft 72 engages the spring 50 at one end thereof The other end of spring 50 engages back-up disk 49c thereby biasing the piston away from the chamber bottom 52. The spring 50 must be sufficiently strong to draw fluid into the chamber 46.

A piston cup 78 mounts to the end of the piston shaft 72 with a shaft-stop 80 therebetween. The shaft-stop serves to distribute force from the piston cup 78 to the shaft 72. The piston cup 78 extends outside the bearing housing 74. Force applied to the piston cup (by, for example, the cam 60 shown in FIG. 1) causes the piston 48 to pressurize fluid in the chamber 46 and discharge the fluid through outlet 56. A cap 82 contains a linear bearing 84 within bearing housing 74. The linear bearing 84 maintains a seal for piston cup 78 and provides a surface against which the piston cup 78 moves.

The various parts the pump 42 that encounter the fluid being pumped should be both water and organic-solvent compatible. The pump is primarily made of stainless steel or other corrosion resistant materials.

Figure 3C:
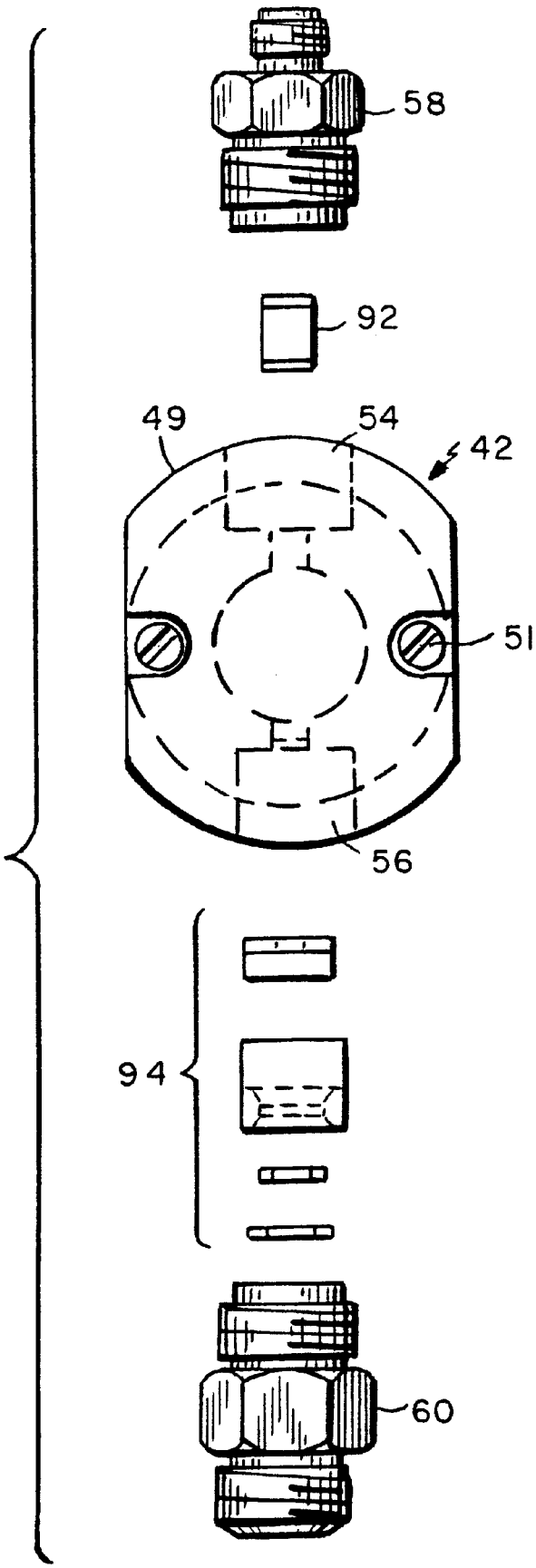
FIG. 3C is an end view of the pump of FIGS. 3A and 3B.

FIG. 3C shows an end view of the pump 42. Check valves 58, 60 mount to the outlet 54 a seal 92 is provided in check valve 58 and inlet 56, respectively. A standard high-pressure valve mechanism is provided in the outlet check valve 58. A standard ball and seat assembly 94 provides the checking mechanism in the inlet check valve 60.

It should be understood that the preceding is merely a detailed description of certain preferred embodiments. It therefore should be apparent to those skilled in the art that various modifications and equivalents can be made without departing from the spirit or scope of the invention.

I claim:

1. An electrical power generating system for use in a vehicle, comprising:

a source of fuel;

a source of liquid;

a fuel cell; and a first pump in fluid communication between the fuel source and the fuel cell, the first pump including (i) a reciprocating piston for drawing fuel from its source and delivering the fuel to the fuel cell, (ii) an inlet check valve in fluid communication between the fuel source and the first pump to prevent backflow from the first pump and (iii) an outlet check valve in fluid communication between the first pump and the fuel cell to prevent backflow to the first pump; and a second pump in fluid communication between the liquid source and the fuel cell, the second pump including (i) a reciprocating piston for drawing liquid from its source and delivering the liquid to the fuel cell, (ii) an inlet check valve in fluid communication between the liquid source and the second pump to prevent backflow from the second pump and (iii) an outlet check valve in fluid communication between the second pump and the fuel cell to prevent backflow to the second pump, whereby the flow rate of fuel and the flow rate of liquid is deliverable to the fuel cell in an accurate and reproducible manner.

2. The power generating system according to claim 1, further comprising a reformer system in fluid communication with and between the pumps and the fuel cell, the reformer system generating a variable and random back pressure with respect to the pumps, whereby the pumps accurately and reproducibly deliver the fuel and the liquid to the fuel cell.

3. The power generating system according to claim 2, wherein the reformer system includes a vaporizer for converting the fuel and the liquid into a gas.

4. The power generating system according to claim 2, wherein the back pressure generated by the reformer system includes a load-based component.

5. The power generating system according to claim 4, wherein the back pressure generated by the reformer system includes a random component.

6. The power generating system according to claim 1, further comprising a first controllable piston driver coupled to one of the pistons and a second controllable piston driver coupled to another of the pistons, each for driving its respective piston.

7. The power generating system according to claim 6, further comprising a controller coupled to the piston drivers for controlling the piston drivers thereby delivering each of the fuel and the liquid to the fuel cell at an independently controllable rate.

8. The power generating system according to claim 1, wherein each pump includes at least two reciprocating pistons.

9. The power generating system according to claim 8, wherein at least one of the reciprocating pistons of each pump is not in phase with another piston of such pump such that each respective pump delivers the fuel and the liquid to the fuel cell substantially pulse-free.

* * * * *